UNITED STATES PATENT OFFICE.

GEORGE W. SCOLLAY, OF NEW YORK, N. Y.

PROCESS OF REFINING COTTON-SEED OIL.

SPECIFICATION forming part of Letters Patent No. 378,114, dated February 21, 1888.

Application filed May 25, 1887. Serial No. 239,330. (No specimens.)

*To all whom it may concern:*

Be it known that I, GEORGE W. SCOLLAY, a citizen of the United States, at present residing in the city, county, and State of New York, have invented certain new and useful Improvements in the Art of Refining Cotton-Seed Oil and Making Paint in a Single Operation; and I do hereby declare the following to be a description of my said invention and of the manner of practicing the same in such full, clear, concise, and exact terms as to enable those skilled in the arts to which my invention appertains or with which it is most nearly connected to make and use the same, reference being had to a specification making part of an application for a patent for an invention pertaining to the same general subject-matter, and which application was filed September 18, 1886, and bears Serial No. 213,926.

The invention covered by the claim of the above-mentioned specification is a process which consists of treating the oil with any of the ochers that are suitable to be used as a pigment in the manufacture of paint, by which the impurities of the oil are combined with the ocher, and of then separating the refined oil from the ocher carrying the impurities, thus obtaining a double product, consisting of refined oil and a paint having a mineral base or pigment, combined with the oily residuum.

At the time the above-described invention was made other inventions and improvements appertaining to the same general subject-matter had been and were being made by me, and which I have since perfected, and one of them is as follows—that is to say, assuming the invention described in the specification aforesaid to be understood, the improvement making the subject-matter of this application consists of treating some classes or varieties of the oil, notably those that are old and heavily charged with impurities, and in some cases containing traces of acid, substantially as follows: First, reduce the ocher to a fine powder, providing about ten pounds of ocher for every one hundred pounds of oil to be refined, and then take about ten per cent. of the amount of ocher to be used and put with it from one-half of one per cent. to one and a half per cent. of dry caustic soda or biborate of soda in a finely-powdered state; second, mix this with the oil to be refined and agitate it briskly for from ten to fifteen minutes; third, add of chloride of calcium, in just enough water to dissolve it, about twice the weight of the soda or biborate of soda, and continue the agitation for ten or fifteen minutes longer; fourth, add now the balance of the ocher necessary to complete the refining and agitate for from ten to fifteen minutes longer, keeping the temperature at about summer heat. The oil is then ready for the filter.

By this method the drying of the ocher is avoided and both products are improved, as by the reaction of the chloride of calcium all trace of alkali is removed both from the oil and the paint, the soda being converted into chloride of sodium, which is soluble in water, and is pressed out of the filter with the oil and the calcium hydrate, forming with the residuum an insoluble soap or plaster and remaining with the residuum or paint. The pigment is thus prevented from becoming discolored by the alkali, and is at the same time rendered insoluble. One of the points of novelty in this process is in the use of the soda or other suitable alkali in a dry powdered state instead of in a solution of soda and water, which produces alkaline soap or soap-stock in the residuum, which in this process it is necessary to avoid.

A modification of the above-described process is as follows: Combine with the ocher from one-half of one per cent. to one and a half per cent. of either silicate of soda, biborate of soda, caustic soda, or boracic acid mixed with the oil in a dry powdered state, and agitate the mixture of ocher, oil, and chemicals for some twenty or thirty minutes. Then separate the oil from the residuum, as described in the specification above mentioned, and treat the residuum with about three per cent. of chloride of calcium dissolved in the smallest quantity of water sufficient for the purpose, the object being to neutralize the alkali in the residuum and to form a calcium soap, and in case any alkali be present in the oil it may also be treated with the calcium, the oil and the residuum in this case being separately treated with the calcium.

Another modification is, in cases where the crude oil is very gross and refractory, to treat it preliminarily with biborate of soda or boracic acid in the proportion above described, by which a large part of the mucilage is separated from and may be skimmed off of the oil, which is subsequently treated with the soda, ocher, and chloride of calcium to complete the refining, and the first residuum separated from the oil by the biborate may also be mixed with the ocher or with the final residuum, or both, and then treated with the chloride of calcium to perfect the paint.

In describing my invention I have mentioned only cotton-seed oil; but the invention is intended to and does embrace and include the treatment of linseed, poppy, and other vegetable oils by the same process, for the same purpose, and in describing the process all chemicals are intended to be included that are applicable as substitutes for those I have mentioned.

Upon consideration of the specification accompanying the application filed September 18, 1886, it will be observed that while the claim is not limited to the treatment of the "cotton-seed oil of commerce," for the purpose of further refining it with ocher, the specification describes only the treatment of such oil. Now, while it is true that the crude oil can be refined with ocher only, the operation is slower and more expensive. The features, therefore, that distinguish this improvement from the invention described and claimed in the specification above referred to consists of the alkali combined with the ocher, and of the subsequent treatment of the oil and residuum with a neutralizing agent to save them from any injurious effect of the alkali, so that by this improvement the yellow oil of commerce is not only quickly refined into "water-white" oil, but any quality of crude oil is also quickly refined into water-white oil and the residuum made into a paint.

I have filed on even date herewith an application for a patent, bearing Serial No. 239,329, for improvements in the process of refining cotton-seed oil, allied to those covered in this patent.

Having now described my invention and the features that distinguish it from the invention described and claimed in my previous application, the points of novelty I desire to patent are designated in the following claims.

I claim—

1. The process of refining cotton-seed oil, substantially herein described, which consists of mixing said oil with ocher and alkali and subsequently separating the oil from the residuum.

2. The process of refining cotton-seed oil, substantially herein described, which consists of mixing said oil with ocher and alkali, and then with a suitable neutralizing agent, such as chloride of calcium, and subsequently separating the oil from the residuum.

3. The process of refining cotton seed oil and making paint in a single operation, substantially herein described, which consists of mixing said oil with ocher and with alkali, and then mixing it with a suitable neutralizing agent, such as chloride of calcium, and subsequently separating said oil and paint.

4. The process of refining cotton-seed oil and converting its residuum into a paint, substantially herein described, which process consists of mixing said oil with ocher and alkali, of separating said oil and residuum, and then separately mixing either the oil or the residuum, or both, with a suitable neutralizing agent, such as chloride of calcium.

5. The process of refining cotton seed oil and making paint in a single operation, substantially herein described, which consists of mixing said oil with ocher and with alkali in a dry state, and then mixing it with a suitable neutralizing agent, such as chloride of calcium, and subsequently separating said oil and paint.

Dated May 24, 1887.

GEO. W. SCOLLAY.

Witnesses:
AMOS BROADNAX,
J. EDGAR BULL.